United States Patent
Dow et al.

(10) Patent No.: US 9,772,872 B2
(45) Date of Patent: Sep. 26, 2017

(54) VIRTUAL MACHINE COLLABORATIVE SCHEDULING

(71) Applicant: INTERNATIONAL BUSINESS MACHINES CORPORATION, Armonk, NY (US)

(72) Inventors: Eli M. Dow, Poughkeepsie, NY (US); James P. Gilchrist, Poughkeepsie, NY (US); Steven K. Schmidt, Essex Junction, VT (US); Charles J. Stocker, IV, Plainsboro, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 42 days.

(21) Appl. No.: 14/940,568

(22) Filed: Nov. 13, 2015

(65) Prior Publication Data
US 2017/0139728 A1  May 18, 2017

(51) Int. Cl.
*G06F 9/46* (2006.01)
*G06F 9/455* (2006.01)

(52) U.S. Cl.
CPC .. *G06F 9/45558* (2013.01); *G06F 2009/4557* (2013.01)

(58) Field of Classification Search
CPC ............................................. G06F 2009/4557
USPC .......................................................... 718/1
See application file for complete search history.

(56) References Cited

U.S. PATENT DOCUMENTS

| 8,010,679 | B2 | 8/2011 | Low et al. |
| 8,355,407 | B2 | 1/2013 | Wookey et al. |
| 2007/0283347 | A1 | 12/2007 | Bobroff et al. |
| 2011/0047544 | A1* | 2/2011 | Yehuda ................ G06F 9/4555 718/1 |
| 2011/0231839 | A1* | 9/2011 | Bennett ................ G06F 9/5055 718/1 |
| 2013/0031547 | A1* | 1/2013 | Kutch ................ G06F 9/45558 718/1 |

FOREIGN PATENT DOCUMENTS

CN    104077171 A    10/2014

OTHER PUBLICATIONS

U.S. Appl. No. 15/078,040, filed Mar. 23, 2016.
Disclosed Anonymously, "VM Migration based on multi criterion ranking of Hypervisors and Virtual Machines in Software Defined Data Center (SDDC) Environments," IP.COM, IP.com No. 000240063, Dec. 29, 2014, pp. 1-8.

(Continued)

*Primary Examiner* — Camquy Truong
(74) *Attorney, Agent, or Firm* — Cantor Colburn LLP; Steven Chiu

(57) ABSTRACT

A method for operating a processing system comprising in a hypervisor, negotiating with a host platform to determine compatibility between a virtual machine and the host platform, responsive to determining that the virtual machine is compatible with the host platform, receiving a control block from the virtual machine, tagging the control block with information that associates the control block with a control group, determining whether the hypervisor is a base hypervisor, and scheduling the control block for processing responsive to determining that the hypervisor is the base hypervisor.

5 Claims, 7 Drawing Sheets

(56) References Cited

OTHER PUBLICATIONS

King, Alice, "OpenStack Compute Publication Jan. 2013," IP.COM, IP.com 000225394, Feb. 13, 2013, pp. 1-27.
Zhang, Jing et al., "Task mapper and application-aware virtual machine scheduler oriented for parallel computing," Journal of Zhejiang University-Science C (Computers & Electronics), 2012 13(3), pp. 155-177.
Eli M. Dow, et al.,"Virtual Machine Collaborative Scheduling ", U.S. Appl. No. 15/078,040 , filed Mar. 23, 2016.
List of IBM Patents or Patent Applications Treated as Related; Date filed: Nov. 13, 2015, p. 1-2.

* cited by examiner

VIRTUAL MACHINE COLLABORATIVE SCHEDULING

BACKGROUND

The present invention relates to virtual machines, and more specifically, to scheduling control blocks of virtual machines operating in a processing system.

Virtual machines emulate computer systems. Any number of virtual machines may be operated on a real computing system or network. The virtual machines may naively execute operating systems and software by emulating the underlying hardware of a real machine. Other virtual machines may perform particular processes in a virtual execution environment.

In some instances, virtual machines are controlled by a hypervisor or a virtual machine monitor that typically operates on a host machine and provides a virtual operating platform to virtual machines (guest machines). Such hypervisors may in turn, operate on a guest machine and host additional guest machines (nested hypervisors/virtual machines), such that there may be a hierarchy of hypervisors operating on a real host machine.

SUMMARY

According to an embodiment of the present invention, a method for operating a processing system comprising in a hypervisor, negotiating with a host platform to determine compatibility between a virtual machine and the host platform, responsive to determining that the virtual machine is compatible with the host platform, receiving a control block from the virtual machine, tagging the control block with information that associates the control block with a control group, determining whether the hypervisor is a base hypervisor, and scheduling the control block for processing responsive to determining that the hypervisor is the base hypervisor.

According to another embodiment of the present invention, a method for operating a processing system comprises in a first virtual machine, negotiating with a host platform to determine compatibility between the first virtual machine and the host platform, responsive to determining that the first virtual machine is compatible with the host platform, tagging a control block with information that associates the control block with a control group associated with the first virtual machine, and sending the tagged control block to a scheduler.

According to yet another embodiment of the present invention, a computer program product comprising a computer readable storage medium having program instructions embodied therewith, the program instructions executable by a processor to cause the processor to perform a method that comprises in a hypervisor, negotiating with a host platform to determine compatibility between a virtual machine and the host platform, responsive to determining that the virtual machine is compatible with the host platform, receiving a control block from the virtual machine, tagging the control block with information that associates the control block with a control group, determining whether the hypervisor is a base hypervisor, and scheduling the control block for processing responsive to determining that the hypervisor is the base hypervisor.

DETAILED DESCRIPTION

Hypervisors, or more generally, operating systems, schedule processes or compute tasks by encapsulating each process or task in a uniform memory backed data structure. These data structures can be referred to as control blocks. Hypervisors typically receive control blocks from guest machines, the control blocks are portions of processing tasks that are sent to the real machine hardware for execution. In this regard, if multiple virtual machines are operating on a particular real machine, hypervisors will receive multiple control blocks from each of the virtual machines. The hypervisors may associate control blocks from each virtual machine with corresponding control groups. The hypervisor may then apply scheduling rules that promote fairness in the order in which the control blocks are processed amongst the control groups.

This scheme does indeed promote fairness across control groups if none of the guest machines are in turn hosting other guest machines. In such an alternative scheme, imposing fairness in control block processing becomes more complex. Further, if virtual machines host nested hypervisors or virtual machines of a similar nature, each level of scheduling is operating on the same structures, but the levels of scheduling are isolated from each other. The embodiments described below allow control blocks to be normalized and scheduled from a single context. This reduces scheduling inefficiencies and global scheduling across the system can be optimized.

Figure 1:
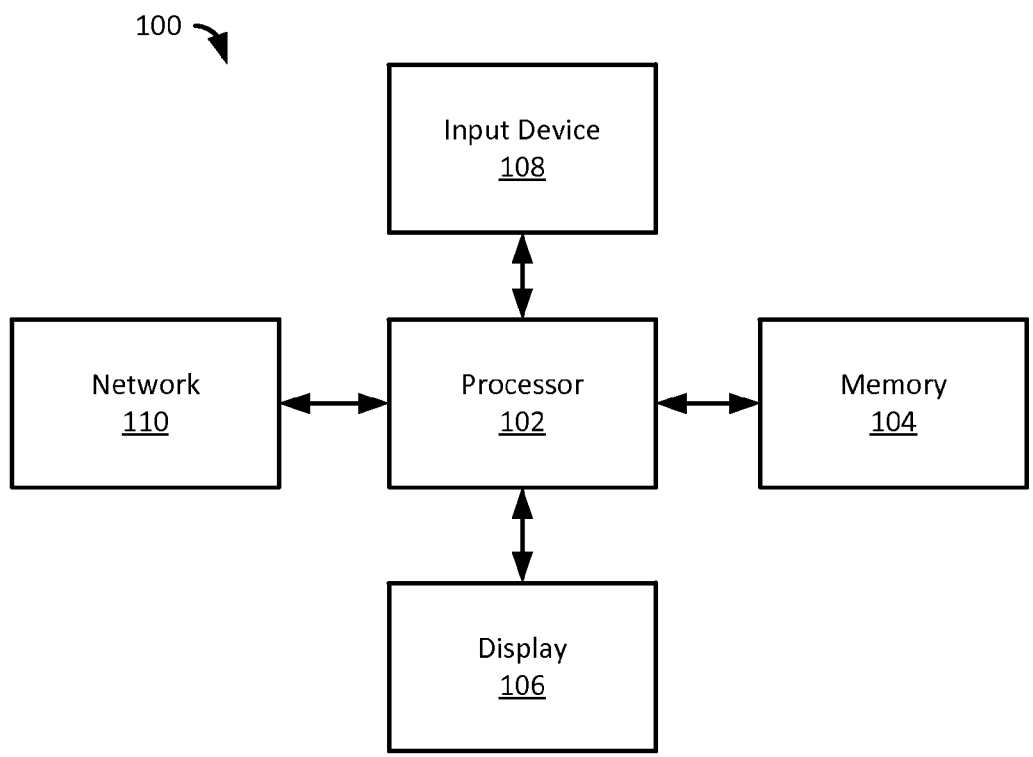
FIG. 1 illustrates an exemplary embodiment of a processing system.

FIG. 1 illustrates an exemplary embodiment of a processing system 100. The system 100 includes a processor portion 102, a memory portion 104 communicatively connected to the processor portion 102, a display 106 communicatively connected to the processor portion 102, and an input device 108 communicatively connected to the processor portion 102. A network 110 may also be communicatively connected to the processing portion 102 such that the processing portion may communicate with other processors and/or share processing tasks with other processors.

Figure 2A:
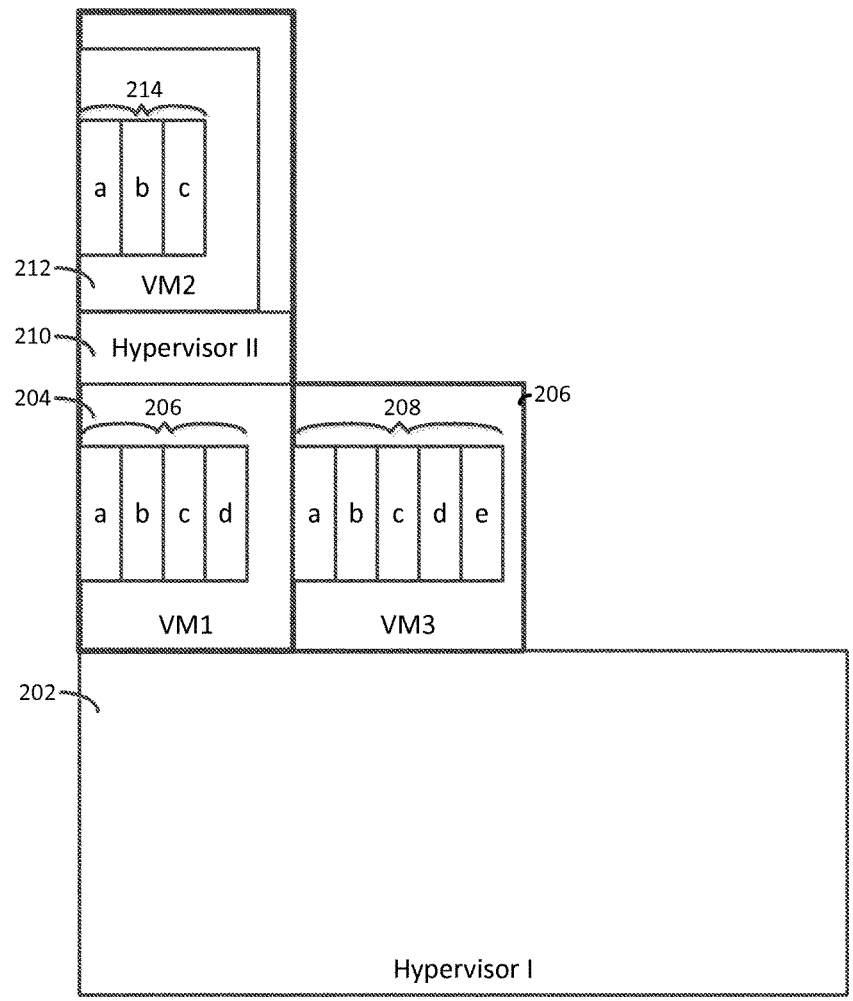
FIG. 2A illustrates an example of a virtual machine system.

FIG. 2A illustrates an example of a virtual machine system that operates on the processor portion 102 (of FIG. 1). The virtual machine system includes a hypervisor I 202 that operates and schedules control block processing on the host system. The hypervisor I 202 hosts a first guest machine or virtual machine (VM1) 204. The VM1 204 runs a hypervisor II 210 that in turn, hosts a second guest machine or virtual machine (VM2) 212. The hypervisor I 202 may host any number of additional guest machines. In the example, a third virtual machine (VM3) 206 is hosted by the hypervisor I 202. Each virtual machine generates and outputs control blocks, for example, VM1 204 includes control blocks 206 (a-d), VM2 212 includes control blocks 214 (a-c), and VM3 206 includes control blocks 208 (a-e).

Figure 2B:
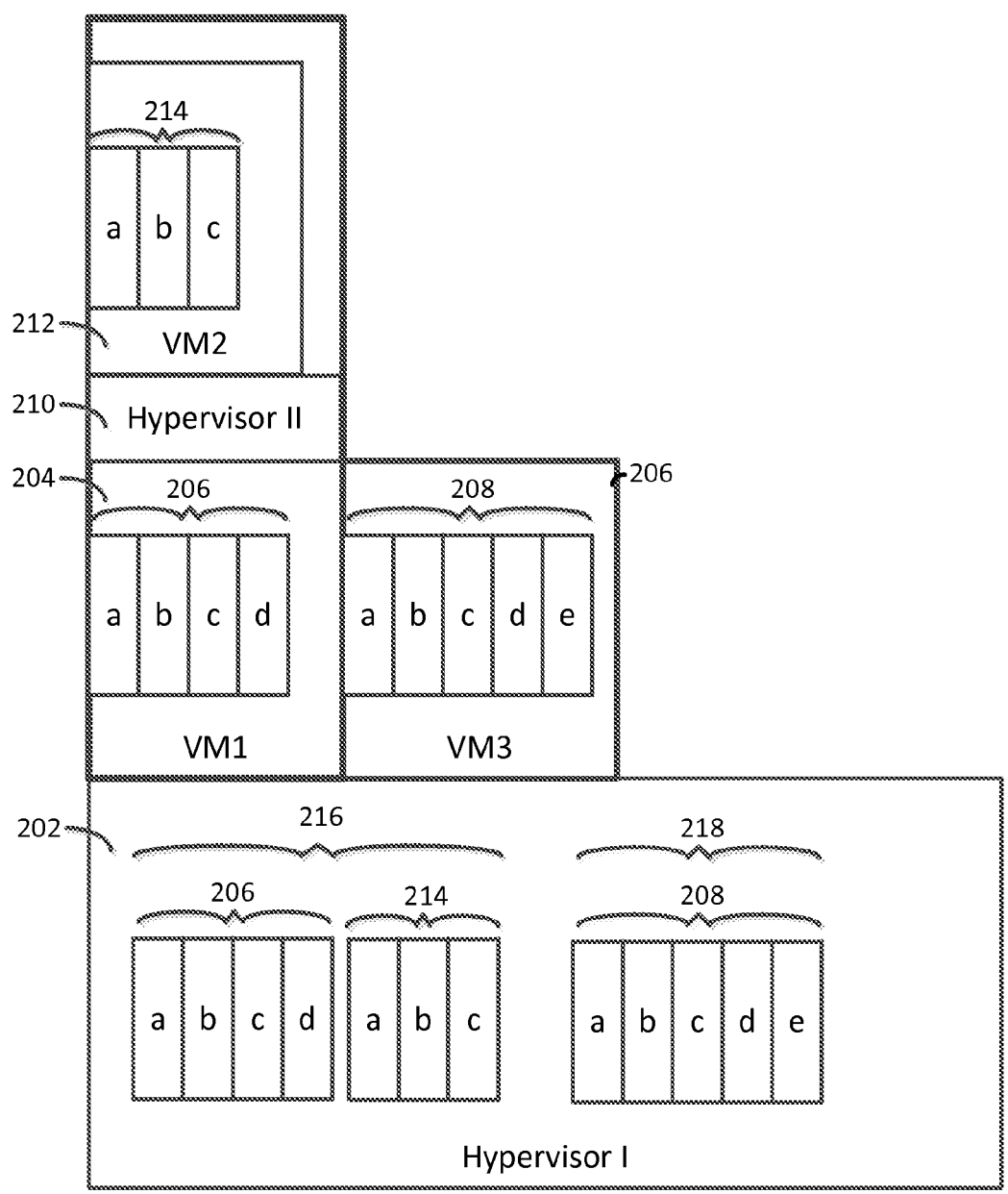
FIG. 2B illustrates the operation of the virtual machine system of FIG. 2A.

FIG. 2B illustrates the operation of the virtual machine system. In operation, the hypervisor II 210 receives control blocks 214 and schedules the control blocks 214 for processing by the VM1 204, which outputs both the control blocks 214 from VM2 212 and the control blocks 206 from VM1 204 to the hypervisor I 202. The hypervisor I 202 receives the control blocks 214 and control blocks 206 as well as the control blocks 208 from the VM3 206. Since the control blocks 206 and 214 were both output by the VM1 204, the hypervisor I 202 groups the control blocks 206 and 214 into a first control group 216 that is associated with the VM1 204. The hypervisor I 202 groups the control blocks 208 in a second control group 218 that is associated with the VM3 206. If the fairness rules associated with allocating real system resources to processing the control blocks are applied with respect to the control groups 216 and 218 one can see that the VM1 204 and VM2 212 will be allocated system resources at a slower rate than the VM3 206.

Figure 3A:
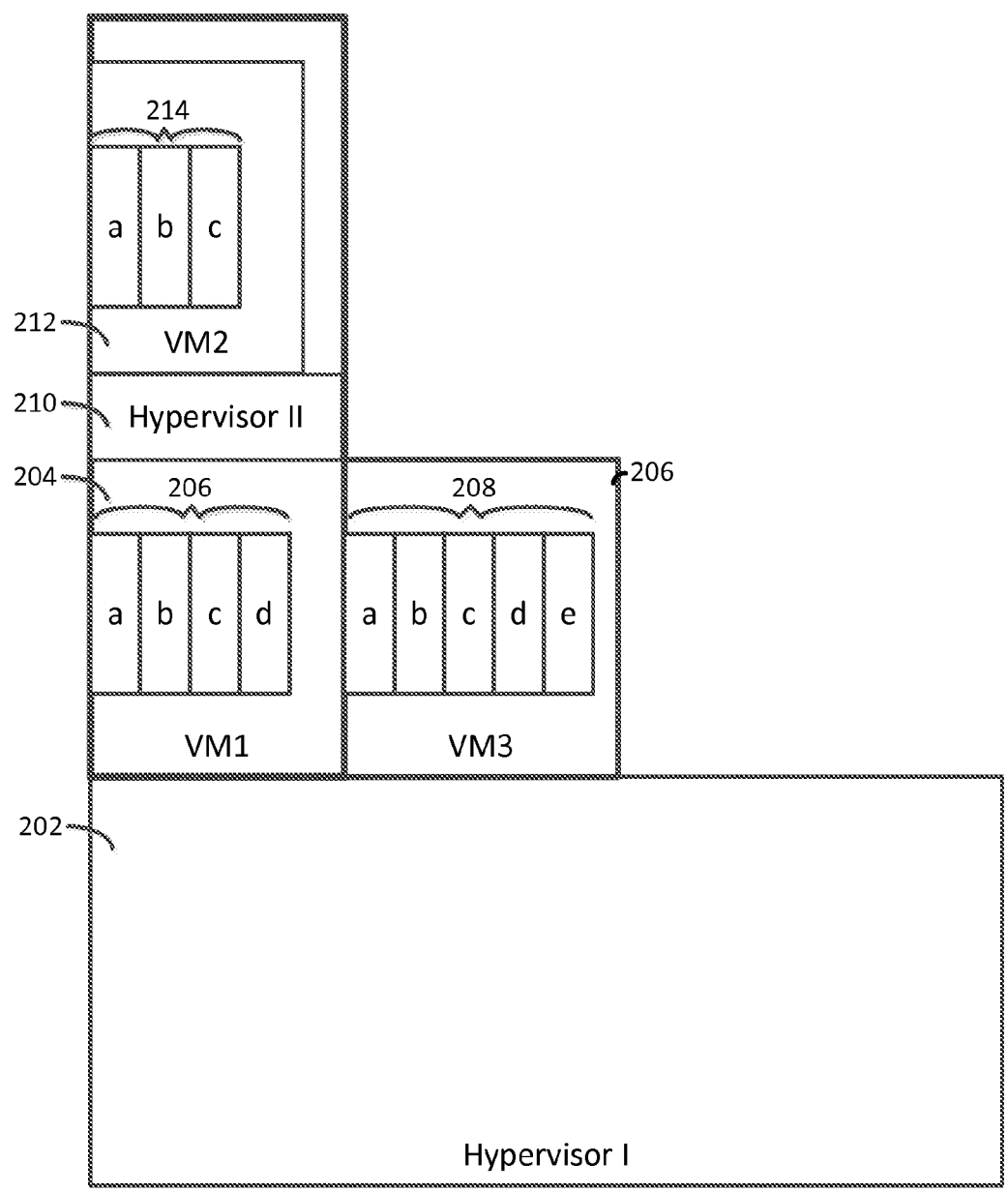
FIGS. 3A and 3B illustrates a diagram of an example of the operation of an exemplary embodiment of the system of FIG. 1 that coordinates the processing of control blocks amongst virtual machines.
Figure 3B:
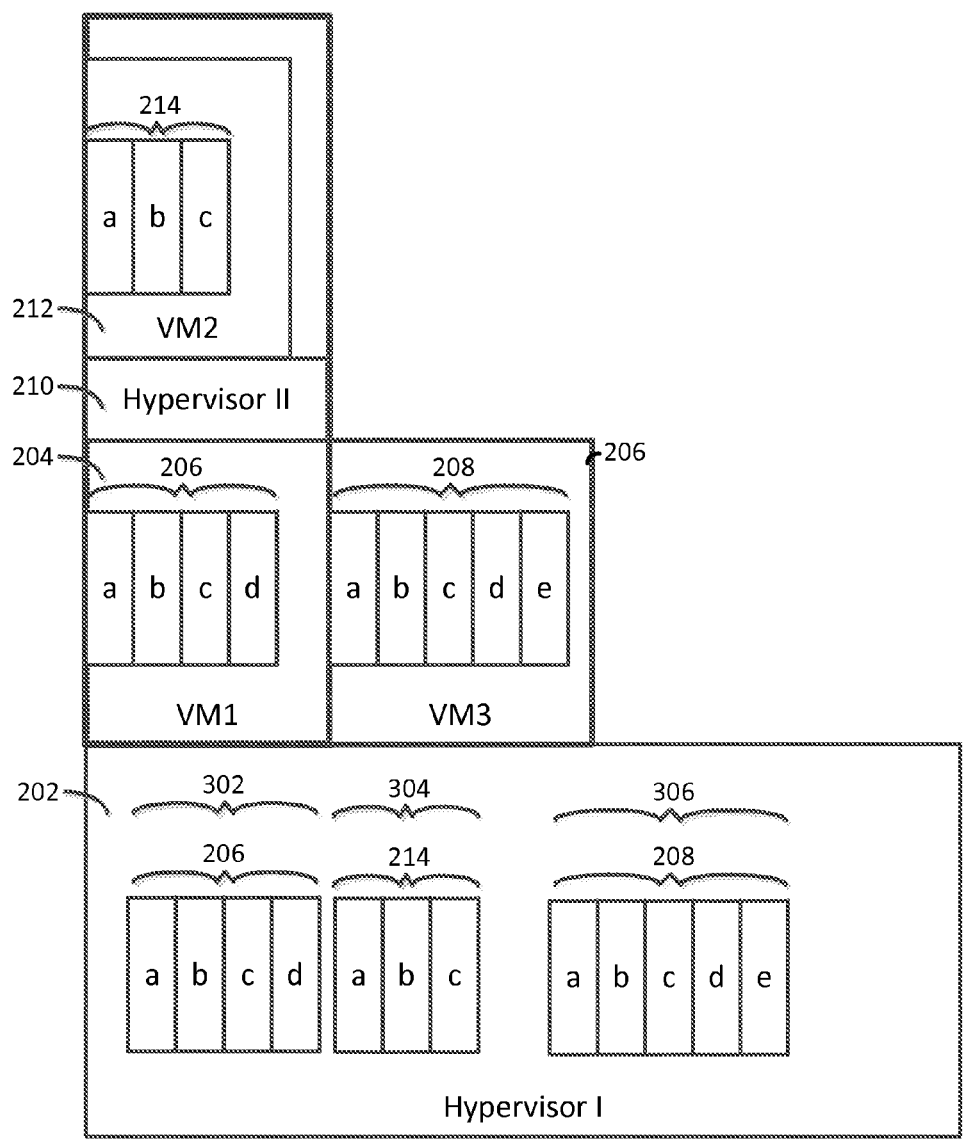

FIGS. 3A and 3B illustrates a diagram of an example of the operation of an exemplary embodiment of a system that coordinates the processing of control blocks amongst virtual machines. In this regard, FIG. 3A is similar to the arrangement of the system described above in FIG. 2A. However, in operation, the hypervisor I 202 and the hypervisor II 210 are operative to negotiate with the guest or virtual machines to ensure that the control blocks generated and output by the virtual machines are compatible with the system such that the control blocks 214 may pass through the hypervisor II 210 and the VM1 204 and be scheduled for processing by the hypervisor I 202 without being scheduled by other hypervisors in the hierarchy.

FIG. 3B illustrates an example of the operation of the exemplary embodiment such that the control blocks 206 of VM1 204 are associated with a control group 302 that is substantially exclusively associated with the VM1 204. Likewise, the control blocks 214 of VM2 212 are associated with a second control group 304 that is substantially exclusively associated with the VM2 212, and the control blocks 208 of VM3 206 are associated with a third control group 306 that is substantially exclusively associated with the VM3 206. Thus, when the hypervisor I 202 operates under a fairness rule to more evenly, fairly, or efficiently schedule the processing of the control blocks by control group, the VM1 206, VM2 212, and VM3 206 are treated substantially equally with respect to the scheduling of the processing of their control blocks.

Figure 4:
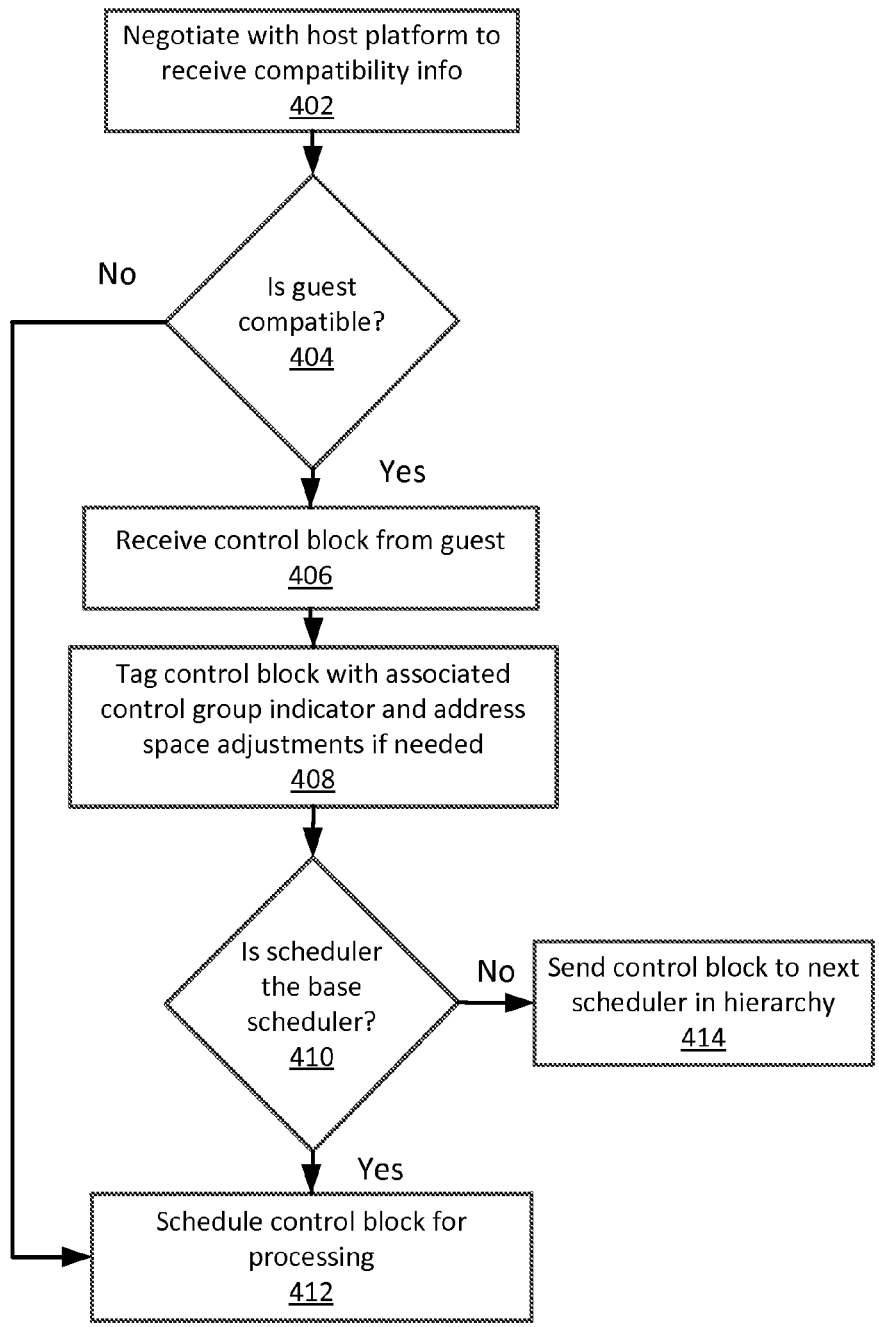
FIG. 4 illustrates a flow diagram of an exemplary operation of a virtual machine or a hypervisor of a virtual machine system.

FIG. 4 illustrates a flow diagram of an exemplary operation of a virtual machine or a hypervisor of a virtual machine system. In this regard, in some embodiments the methods of FIG. 4 (and FIG. 5 described in further detail below) may be performed by either a hypervisor, a virtual machine or both a hypervisor and virtual machine. For clarity, the embodiments described below will be performed by a hypervisor, however alternate embodiments may be performed by a virtual machine or a real machine. Referring to FIG. 4, in block 402 the host platform and the virtual machine negotiate to receive and exchange compatibility information. For example, compatibly information may include memory layout and structure of the control blocks operated on by the hypervisor and guest operating systems. When non-identical guest and host operating systems are used, a lookup table or similar construct may be used to hash control block layout and structure. A look up table or similar construct may be used to map and manipulate structures to make them compatible. Such mapping may include, for example, moving fields or renaming fields of the control blocks. In block 404 if the guest is compatible, the virtual machine will receive a control block from a guest machine in block 406. The virtual machine may apply a tag to the control block that associates the control block with a control group associated with the guest machine, may include information indicative of address space adjustments if needed.

In block 410, if the present hypervisor is the base scheduler (e.g., hypervisor I 202 of FIG. 3A) the hypervisor, will schedule the control block for processing in block 412. If in block 410, the present hypervisor is not the base scheduler; the present hypervisor sends the control block to the next scheduler in the hierarchy in block 414, which performs a similar process starting with block 402.

Figure 5:
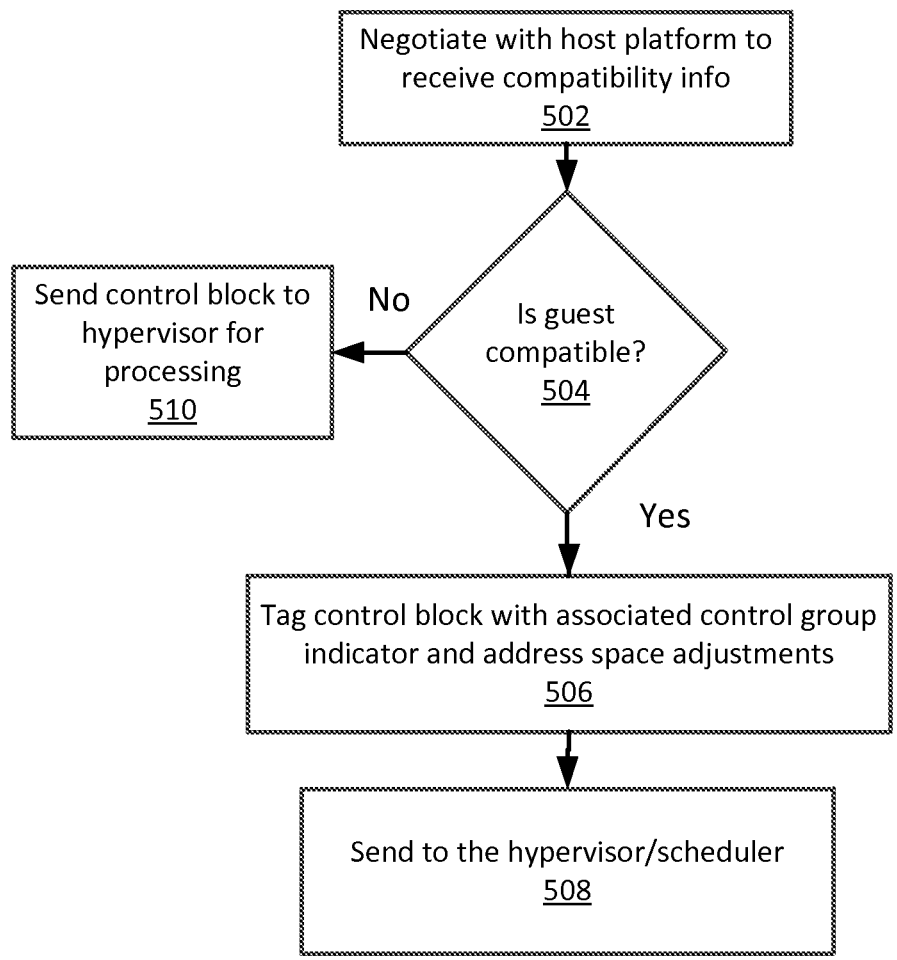
FIG. 5 illustrates an alternate exemplary method of operation that may be performed by a virtual machine.

FIG. 5 illustrates an alternate exemplary method that may be performed by a virtual machine. In this regard, in block 502, the host platform and the virtual machine negotiate to receive and exchange compatibility information. If the host platform and the virtual machine are compatible in block 504, a control block from the virtual machine (guest machine) is sent to the hypervisor. Prior to sending the control block, the virtual machine may tag, annotate, or associate the control block with information that associates the control block with a control group associated with the guest machine, and may include information indicative of address space adjustments if needed.

In block 508, the virtual machine sends the control block to the hypervisor or scheduler for scheduling. Thus, in the embodiment described in FIG. 5, the virtual machine may tag control blocks that are generated or received by the virtual machine with information that identifies the control block group that the control block belongs to, and in some embodiments, include address space information or adjustments that allow the control blocks to be processed fairly, and reduces the processing burdens of the virtual machines or hypervisors in the hierarchy by addressing control blocks to ideally, real address spaces on the host processor.

Such exemplary methods of operation described above improve the efficiency of the processing of the control blocks of virtual machines and improves the performance of the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a processor to cause the processor to perform a method comprising:

in a hypervisor, negotiating with a host platform to determine compatibility between a virtual machine and the host platform;

responsive to determining that the virtual machine is compatible with the host platform:
receiving a control block from the virtual machine;
tagging the control block with information that associates the control block with a control group;
determining whether the hypervisor is a base hypervisor; and
scheduling the control block for processing responsive to determining that the hypervisor is the base hypervisor; and responsive to determining that the virtual machine is not compatible with the host platform, scheduling the control block for processing with the hypervisor.

2. The computer program product of claim 1, wherein responsive to determining that the hypervisor is not the base hypervisor, sending the control block to another hypervisor in a hypervisor hierarchy.

3. The computer program product of claim 1, the method further comprising, tagging the control block with address space adjustments after receiving the control block from the virtual machine.

4. The computer program product of claim 1, wherein the base hypervisor is the highest hypervisor in a hypervisor hierarchy.

5. The computer program product of claim 1, wherein the host platform includes a real machine processor.

* * * * *